United States Patent [19]

Wazumi

[11] Patent Number: 5,546,594
[45] Date of Patent: Aug. 13, 1996

[54] COOPERATIVE DISTRIBUTED PROBLEM SOLVER

[75] Inventor: Seiichiro Wazumi, Yokohama, Japan

[73] Assignee: Kabushiki Kaisha Toshiba, Japan

[21] Appl. No.: 412,226

[22] Filed: Mar. 27, 1995

Related U.S. Application Data

[63] Continuation of Ser. No. 963,753, Oct. 20, 1992, abandoned.

[30] Foreign Application Priority Data

Nov. 26, 1991 [JP] Japan ................... 3-311030

[51] Int. Cl.⁶ .................................................. G06F 15/16
[52] U.S. Cl. .................... 395/800; 395/650; 364/DIG. 1; 364/281.3
[58] Field of Search ................................... 395/200, 800, 395/600, 650, 53, 76, 77, 162, 163; 364/131–136

[56] References Cited

U.S. PATENT DOCUMENTS

| | | | |
|---|---|---|---|
| 3,753,234 | 8/1973 | Gilbert et al. | 395/200 |
| 4,459,664 | 7/1984 | Pottier et al. | 395/200 |
| 4,648,061 | 3/1987 | Foster | 395/200 |
| 4,891,785 | 1/1990 | Donohoo | 395/200 |
| 4,943,932 | 7/1990 | Lark et al. | 395/76 |
| 5,063,500 | 11/1991 | Shorter | 395/200 |
| 5,090,011 | 2/1992 | Fukuta et al. | 370/60 |
| 5,155,808 | 10/1992 | Shimizo | 395/200 |
| 5,166,930 | 11/1992 | Braff et al. | 370/94.1 |
| 5,231,631 | 7/1993 | Buhrke et al. | 370/60 |
| 5,237,567 | 8/1993 | Nay et al. | 370/85.1 |

FOREIGN PATENT DOCUMENTS

| | | |
|---|---|---|
| 0212499 | 3/1977 | European Pat. Off. . |
| 0208457 | 1/1987 | European Pat. Off. . |
| 0295380 | 12/1988 | European Pat. Off. . |
| 0326164 | 8/1989 | European Pat. Off. . |
| 0333537 | 9/1989 | European Pat. Off. . |
| 1335033 | 10/1973 | United Kingdom . |
| 84/01043 | 3/1984 | WIPO . |

OTHER PUBLICATIONS

Oliveira et al, "Controlling Cooperative Experts in a Real Time System", IEEE, London, UK, Third International Conference on Software Engineering for Real Time Systems (Conf. Publ. No:344 pp. 176–181) 16–18 Sep. 1991.

Tibor Gyrres, "Multiple Task Selection Protocol in a Distributed Problem Solving Network", Springer-Verlag Publisher-West Germany, 2nd Symposium on Mathematical Fundementals of Database Systems Proceedings pp. 222–236, 26–30 Jun. 1989.

Brigitte Laasri et al, "An Analysis of Negotiation & Its Role for Coordinating Cooperative Distributed Problem Solvers", Eleventh International Conference. Expert Systems and their Applications pp. 81–94, vol. 2 27–31 May 1991.

*Primary Examiner*—Mehmet B. Geckil
*Attorney, Agent, or Firm*—Banner & Allegretti, Ltd.

[57] ABSTRACT

Each of a plurality of agents includes a self-information management section for managing information associated with the self-agent, an information exchanging section for exchanging the information associated with the self-agent and pieces of information associated with the remaining agents, a problem solving information selecting section for selecting information associated with a problem solving operation of the self-agent from the pieces of information, associated with the remaining agents, which is output from the information exchanging section, and a problem solving information management section for managing the information managed by the self-information management section and the information selected by the problem solving information selecting section. Each agent exchanges information associated with itself and information associated with the remaining agents so that each agent can use pieces of management information associated with the remaining agents which are required to select cooperative agents required to solve a problem held by each agent. Therefore, the communication amount between the respective agents in selection of cooperative agents can be reduced. In addition, concentration of load on a specific agent can be prevented, and hence the influence of a defective agent on the remaining agents can be reduced.

6 Claims, 6 Drawing Sheets

FIG. 6

COOPERATIVE DISTRIBUTED PROBLEM SOLVER

This application is a continuation of application Ser. No. 07/963,753, filed Oct. 20, 1992, now abandoned.

BACKGROUND OF THE INVENTION

1. Field of the Invention

The present invention relates to a cooperative distributed problem solver in which a plurality of agents cooperate to solve a problem.

2. Description of the Related Art

A cooperative distributed problem solver has been known as a solver in which a plurality of agents cooperate to solve a problem which is difficult for a single problem solver to solve. In this case, although an agent means a problem solver, each problem solver constituting a cooperative distributed problem solver will be specifically called an agent in order to distinguish it from a single problem solver. Each agent constituting this cooperative distributed problem solver performs a problem solving in cooperation with other agents. In this operation, agents suitable for cooperation must be selected. For this selection, each agent requires information about other agents.

Conventional methods of selecting agents are: a mutual selection method in which agents requiring cooperation and required agents select each other on the basis of their own criteria; and a selection method in which a management agent for managing pieces of information about all the agents is independently prepared, and agents are selected on the basis of information which is transmitted from the management agent in response to a request for information required for selection.

A typical example of the former mutual selection is called contract net protocol, which is disclosed in Reid G. Smith, "The Contract Net Protocol: High-Level Communication and Control in a Distributed Problem Solver", Reading in Distributed Artificial Intelligence, pp. 357–366. In the contract net protocol, an agent requiring cooperation (to be referred to as a "manager" hereinafter) informs the remaining agents constituting the cooperative distributed problem solver that it requires cooperation and performs selection of cooperative agents. That is, the agent performs broadcasting. Upon this broadcasting, agents capable of cooperation inform the manager that they can cooperate to solve the problem with the manager. That is, they submit bids as tenders. The manager evaluates the bids to select agents suitable for cooperation, and informs the selected agents that they are selected as cooperative agents. That is, the manager makes contracts. Subsequently, the manager performs a problem solving operation in cooperation with the selected agents. In this manner, according to the contract net protocol, each agent can perform selection by utilizing pieces of dynamic information about other agents.

In the latter selection method using the management agent, pieces of information required for the respective agents to select cooperative agents are concentratedly managed by the management agent. Each agent requiring other cooperative agents requests information required for the selection of cooperative agents from the management agent, and performs selection on the basis of the received information. Such a selection method is disclosed, as an example, in "System & Network Administration", chap 14, The Sun Yellow Pages Services (Sun Work Station Manual). According to this method, in communication between agents, information to be managed by the management agent is acquired, each agent requests information for the selection of cooperate agents from the management agent, and information is transmitted/received between agents which operate in cooperation. Therefore, an increase in communication amount between agents can be suppressed.

In the contract net protocol, however, exchange of information required for selection between agents by means of broadcasting and a bid is performed for every selection of cooperative agents, and broadcasting is performed with respect to all the agents. Therefore, the communication amount between agents upon solving a problem increases with an increase in the frequency of occasions demanding cooperation and the number of agents. In the selection method using the management agent, as the necessity for cooperation increases with an increase in the number of agents and the size of a problem, the amount of information to be managed by the management agent and the number of requests for information with respect to the management agent increase. Consequently, the load of the management agent increases. Since the load of the management agent exclusively increases, the processing performance of the management agent becomes a bottleneck. That is, the processing performance of the management agent limits the overall processing speed of the cooperative distributed problem solver. In addition, if the management agent is stopped, all the agents cannot select agents suitable for cooperation. For this reason, a plurality of management agents must be set, and a mechanism for maintaining the information matching between the management agents is newly required.

SUMMARY OF THE INVENTION

The present invention has been made to eliminate the above problems, and has as its object to provide a cooperative distributed problem solver which can suppress an increase in communication amount between agents in selection of cooperative agents, prevent concentration of load on a specific agent, and reduce the influence of a defective agent on other agents.

According to the present invention, there is provided a cooperative distributed problem solver in which a plurality of agents cooperate to solve a problem of each agent, comprising: a communication network, connected to each agent, for communicating information between the plurality of agents; and the plurality of agents, each including problem solving means for solving a problem of a self-agent, and information acquisition/management means for selecting cooperative agents to solve problems of the self-agent and a remaining agent, and acquiring and managing information associated with each agent.

In a cooperative distributed problem solver in which a plurality of agents cooperate to solve a problem, each of the plurality of agents comprises self-information management means for managing information associated with the self-agent which is held by the problem solving means, information exchanging means for exchanging the information associated with the self-agent and managed by the self-information management means and information associated with remaining agents, problem solving information selecting means for selecting and generating information associated with a problem solving operation of the self-agent from the information associated with the remaining agent and received from the remaining agent by the information exchanging means and the information associated with the self-agent and managed by the self-information management means, and problem solving information management means for managing the information managed by the self-information management means and the information selected by the problem solving information selecting means. In this arrangement, when a new agent is added to the solver, for example, information associated with the new agent and pieces of information associated with the remaining agents are exchanged so that each agent can subsequently use management information associated with the remaining agents which are required to select cooperative agents required to solve a problem held by each agent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A cooperative distributed problem solver according to an embodiment of the present invention will be described below with reference to the accompanying drawings.

Figure 1:
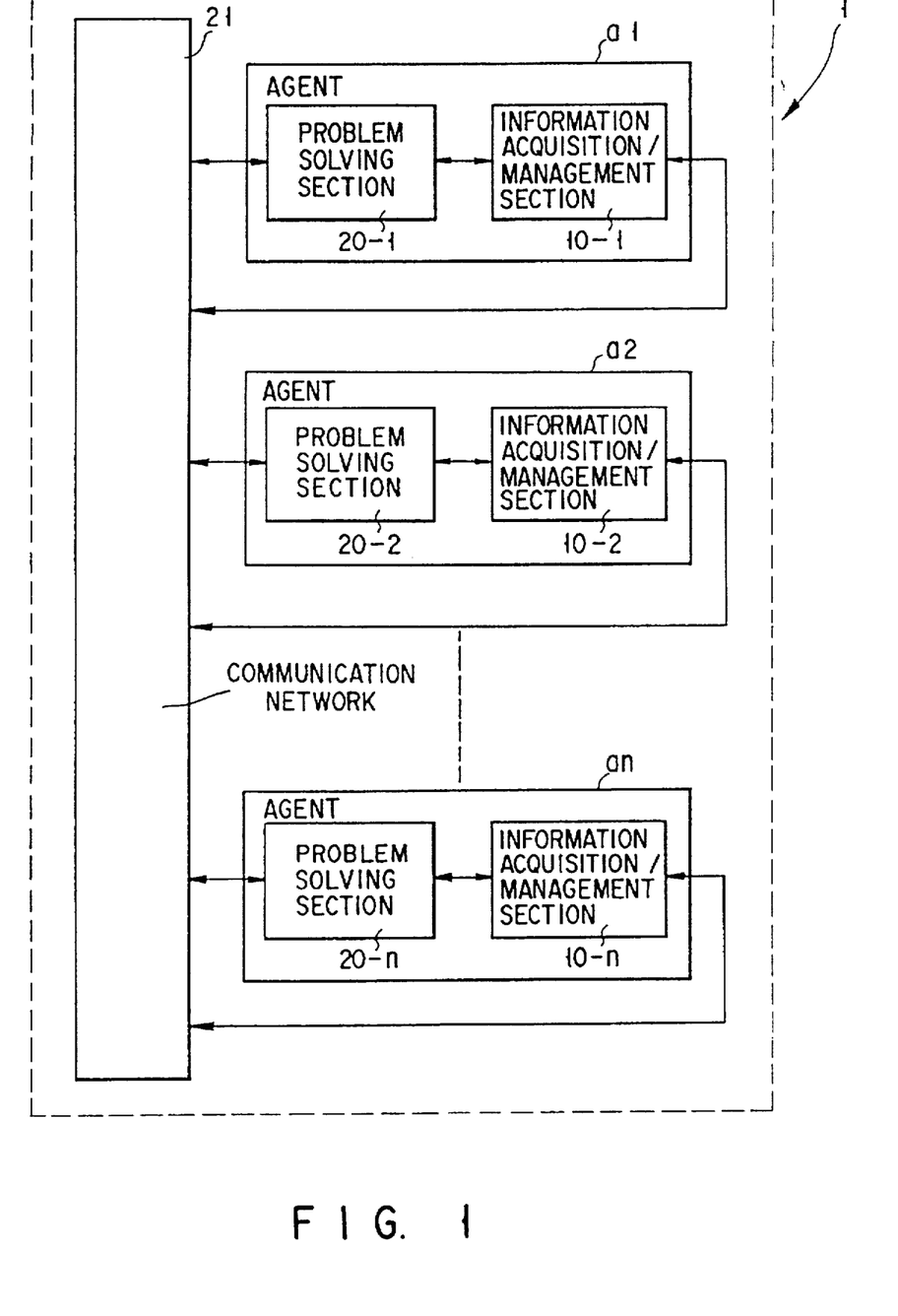
FIG. 1 is a block diagram showing the overall arrangement of a cooperative distributed problem solver according to an embodiment of the present invention.

FIG. 1 is a block diagram showing the overall arrangement of the cooperative distributed problem solver according to the embodiment of the present invention. Referring to FIG. 1, a cooperative distributed problem solver 1 is constituted by a communication network 21 and a plurality of agents a1 to an connected thereto. The plurality of agents a1 to an have the same arrangement and respectively include problem solving sections 20-1 to 20-n and information acquisition/management sections 10-1 to 10-n. With this arrangement, each agent performs a problem solving by using its problem solving section with cooperating with other agents. The information acquisition/management section of each agent has pieces of information associated with the remaining agents and required to select agents suitable for a cooperative problem solving, as will be described in detail later. The problem solving section of each agent utilizes the pieces of information to perform a cooperative problem solving.

Figure 2:
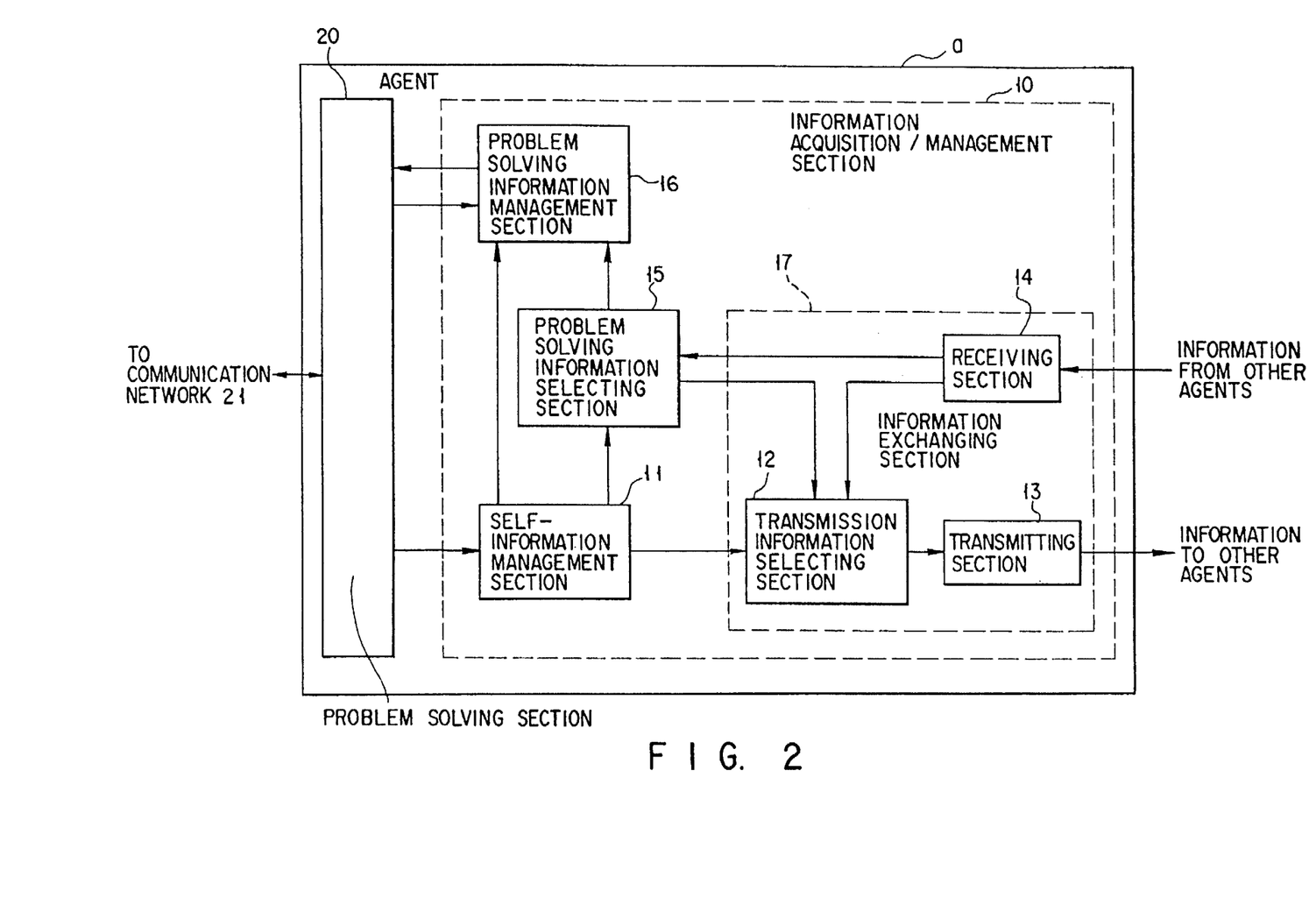
FIG. 2 is a block diagram showing the arrangement of each agent of the cooperative distributed problem solver in FIG. 1.

FIG. 2 is a block diagram showing the arrangement of each agent of the cooperative distributed problem solver in FIG. 1. Referring to FIG. 2, an agent a is constituted by a problem solving section 20 for solving a problem, and an information acquisition/management section 10 for acquiring and managing pieces of information associated with the remaining agents and required to select cooperative agents. The information acquisition/management section 10 comprises: a self-information management section 11 for receiving information associated with the agent a from the problem solving section 20 and managing the information; an information exchanging section 17 for exchanging the information associated with the agent a and managed by the self-information management section 11 and pieces of information associated with the remaining agents; a problem solving information selecting section 15 for selecting information associated with a problem solving operation of the agent a from the information output from the information exchanging section 17 and the information associated with the self-agent and managed by the self-information management section 11; and a problem solving information management section 16 for managing the information managed by the self-information management section 11 and the information selected by the problem solving information selecting section 15. The problem solving information selecting section 15 prestores a selection criterion serving as a criterion of information to be managed by the problem solving information management section 16. The selection criterion is added to information voluntarily transmitted by the agent a so as to serve as a criterion used by other agent to transmit information. The information exchanging section 17 is constituted by a receiving section 14, a transmission information selecting section 12, and a transmitting section 13. The receiving section 14 receives pieces of information from other agents, discriminates, in the pieces of information, information required for a problem solving operation of the agent a and information which is requested to be transmitted by other agents, and transmits them to the problem solving information selecting section 15 and the transmission information selecting section 12. When the receiving section 14 receives pieces of information from other agents, the transmission information selecting section 12 selects information required by other agents from the received information and the information managed by the self-information management section 11. The transmitting section 13 transmits the transmission information selected by the transmission information selecting section 12, and performs transmission of the information of the self-information management section 11 in a new agent joining operation. In addition, the problem solving section 20 solves a problem held by the agent a using information from the information acquisition/management section 10.

Figure 3:
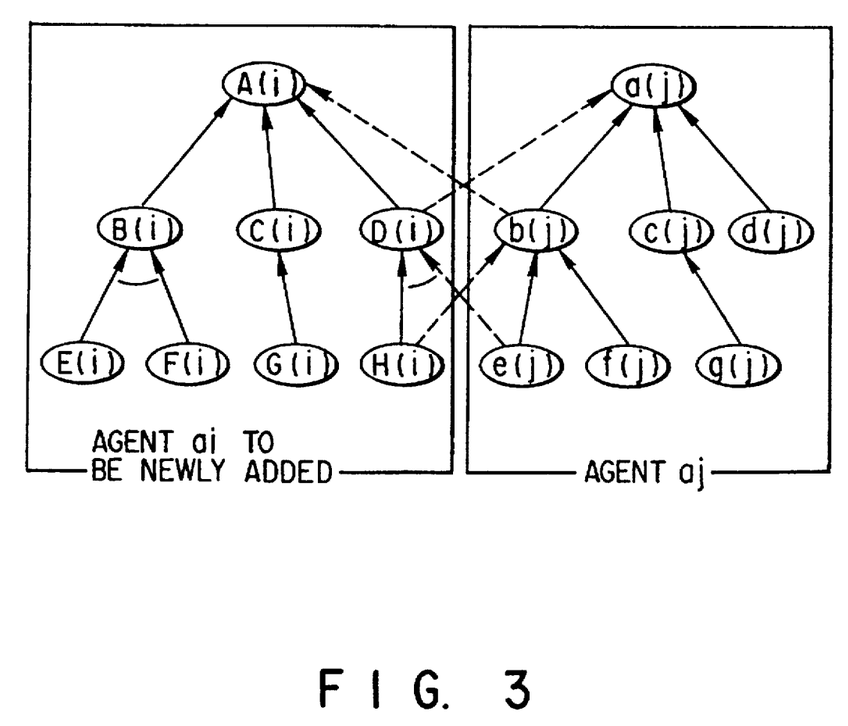
FIG. 3 is a view showing pieces of self-information, which are held by an agent ai to be newly added to the solver and an already added agent aj, and the relationship between the pieces of the information.

FIG. 3 is a view showing pieces of self-information, which are held by an agent ai to be newly added to the apparatus and an already added agent aj, and the relationship between the information. Referring to FIG. 3, in order to execute a task A(i) of the agent ai, one of tasks B(i), C(i), and D(i) of the agent ai or a task b(j) of the agent aj must be executed. In order to execute the task B(i), both tasks E(i)

and F(i) must be executed. Note that each broken arrow indicates that each agent requires a cooperation with other agents to execute its own task since the relationship between the tasks extends over a plurality of agents. However, each agent cannot select a cooperation agent under the condition shown in FIG. 3 since it is not clear for the agent which agent can execute the tasks connected by the broken lines in FIG. 3.

Figure 4:
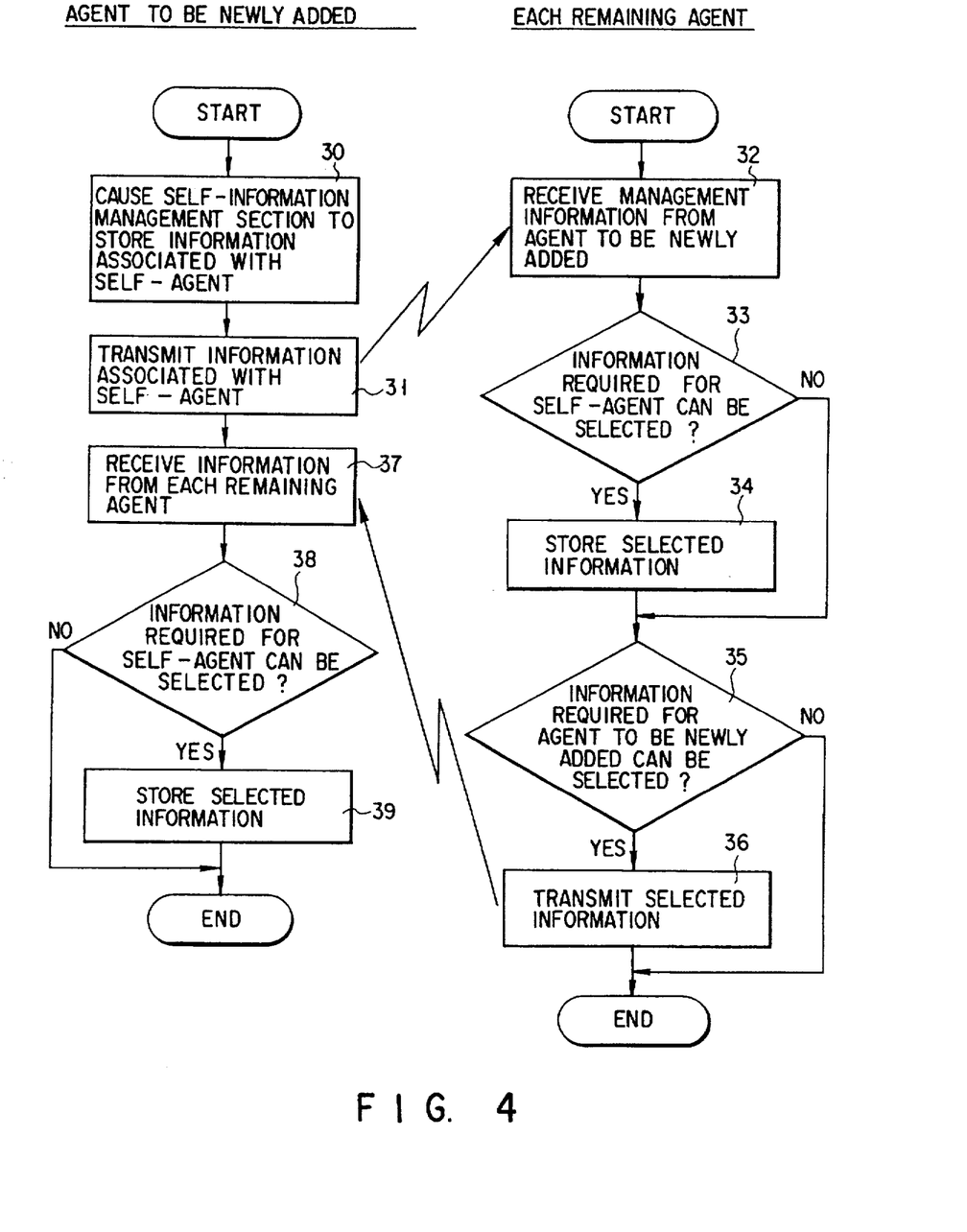
FIG. 4 is a flow chart for explaining an operation for exchanging information each other between an agent to be newly added and other already added agents in a new agent joining operation.

FIG. 4 is a flow chart for explaining an operation of each agent of the cooperative distributed problem solver to exchange their information each other. The flow chart in FIG. 4 exemplifies operations of an agent to be newly added to the cooperative distributed problem solver 1 and other agents when the new agent is jointed to the solver. In cases where pieces of information need to be exchanged with other agents to select cooperative agents, other than the case where a new agent is added to the solver 1, each agent and other agents perform similar operations. The self-information management section 11 of the new agent (to be newly added) receives information associated with the new agent from the problem solving section 20 and stores it (step 30). This information is sent to the problem solving information management section 16. The transmission information selecting section 12 adds a selection criterion, held by the problem solving information selecting section 15, to the information stored in the self-information management section 11, further adds the address of the new agent and an address common to the remaining agents to the information, and transmits the resultant information to the transmitting section 13. The transmitting section 13 transmits the information to the communication network 21 (step 31). Meanwhile, each of the remaining agents checks whether the information transmitted from the new agent is directed to itself, and receives the information through the receiving section 14 (step 32). In addition, pieces of information transmitted from the remaining agents and received through the receiving section 14 are input to the problem solving information selecting section 15. The problem solving information selecting section 15 checks on the basis of a prestored selection criterion whether information required to select cooperative agents for solving a problem of the self-agent by using management information associated with the self-agent, stored in the self-information management section 11, and the information from the receiving section 14 (step 33). If information required for the selection of cooperative agents can be selected, the information selected by the problem solving information selecting section 15 is input to the problem solving management section 16. The problem solving management section 16 stores and manages the selected information (step 34). The flow then advances to step 35. If it is determined that the problem solving information selecting section 15 cannot select information required for the selection of cooperative agents, the flow also advances to step 35. Furthermore, the transmission information selecting section 12 of each of the remaining agents determines on the basis of the selection criterion included in the information transmitted from the new agent whether information required for the new agent to solve the problem can be selected from the information received through the receiving section 14 and the management information associated with the self-agent and managed by the self-information management section 11 (step 35). If it is determined that the transmission information selecting section 12 can select information required for the new agent, the address of the self-agent and the address of the new agent as the destination are added to the selected information, and the resultant information is transmitted from the transmitting section 13 to the communication network 21 (step 36). With this processing, the operation of each of the remaining agents for providing the new agent with information is completed. Note that if it is determined that the transmission information selecting section 12 cannot select information required by the new agent, the operation of each of the remaining agents with respect to the newly added agent is completed. Meanwhile, the receiving section 14 of the new agent checks, on the basis of the address data included in the information transmitted from the transmitting section 13 of each of the remaining agents, whether the information is information required by the new agent, and the receiving section 14 receives the information from the communication network 21 (step 37). Thereafter, the problem solving information selection section 15 of the new agent checks, on the basis of the selection criterion held beforehand by the new agent, whether information required to select cooperative agents for the problem solving operation of the new agent can be selected from the information received by the receiving section 14 and the management information managed by the self-information management section 11 (step 38). The information determined and selected, as information required for the problem solving operation of the new agent, by the problem solving information selecting section 15 is input to the problem solving information management section 16. The problem solving information management section 16 stores and manages the selected information (step 39). The problem solving section 20 accesses the information when a cooperate problem solving operation is to be performed. With this operation, the operation of the new agent in the new agent joining operation to collect information with respect to the remaining agents is completed. If the problem solving information selecting section 15 determines in step 38 that all the received information is not required, the operation of the new agent during the new agent joining operation is completed.

Figure 5:
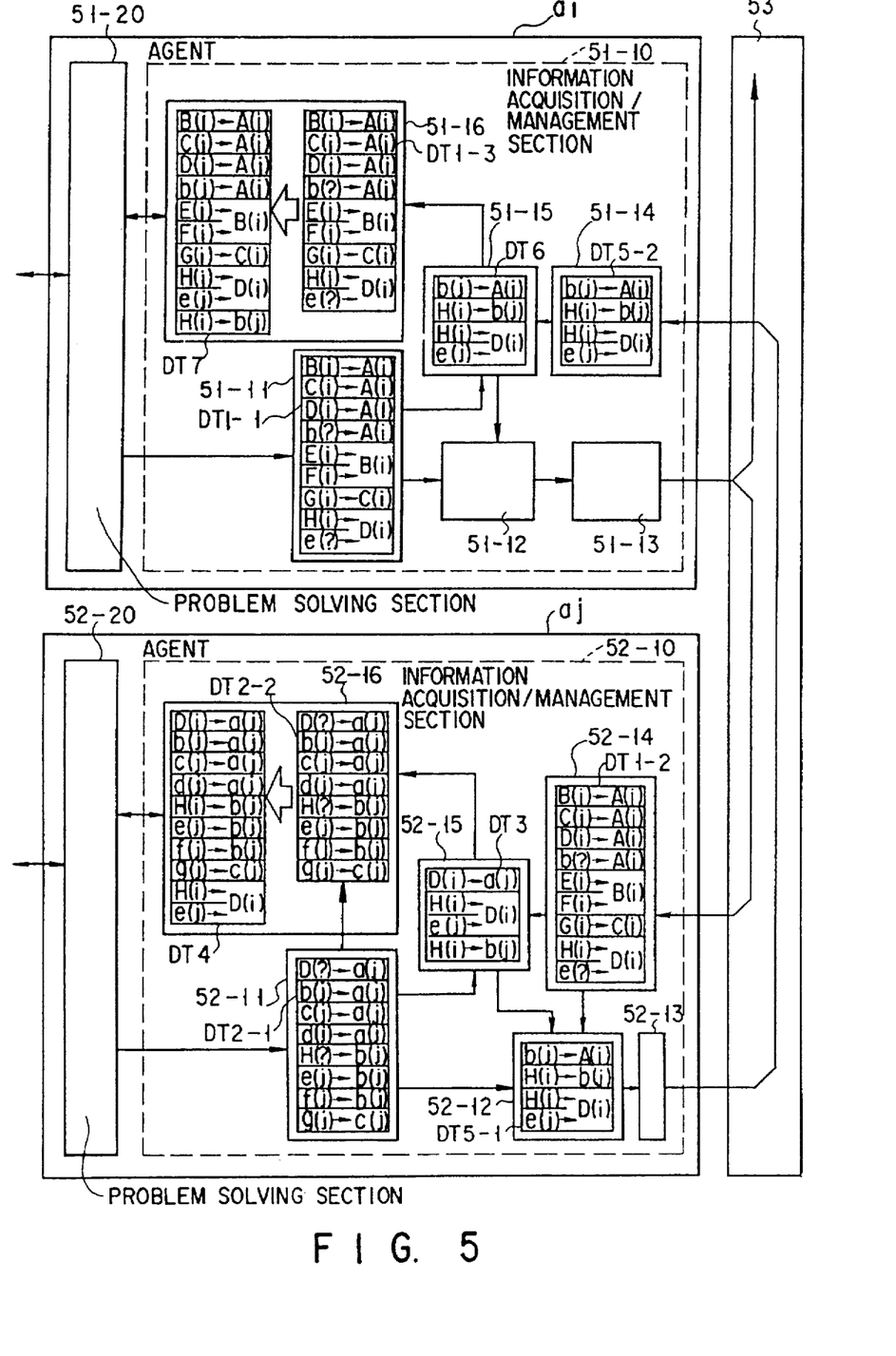
FIG. 5 is a view showing a detailed example of the flow of information when the agent ai in FIG. 3 is newly added.

FIG. 5 is a view showing a detailed example of the flow of information between the agents ai and aj shown in FIG. 3 when the agent ai is to be newly added to the solver 1. Referring to FIG. 5, the agent to be newly added is the agent ai in FIG. 3, and one of the remaining agents is the agent aj in FIG. 3. Information DT1-1 associated with the agent ai, input through a problem solving section 51-20, is stored in a self-information management section 51-11 of the agent ai. In this case, for example, "B(i)→A(i)" indicates that the agent ai needs to execute a task B in order to execute a task A. In addition, "?" indicates that it is not clear which agent can execute a corresponding task. In this information DT1-1, agents which can execute tasks b and e are not clear, and hence cooperative agents capable executing these tasks are to be found. Part of the information DT1-1 is transmitted, as part (not shown) of a selection criterion used for the selection of information to be transmitted from each of the remaining agents, to a problem solving information selecting section 51-15. The information DT1-1 is supplied to a transmission information selecting section 51-12. In the section 51-12, the selection criterion held by the problem solving information selecting section 51-15 is added to the information DT1-1, and the address of the agent ai and a common address as a destination address are added to the information. The resultant information associated with the agent ai is transmitted to each of the remaining agents through a transmitting section 51-13 and a communication network 53. At this time, the information stored in the self-information management section 51-11 is directly supplied to the problem solving information management section 51-16 and is stored therein as information DT1-3.

Subsequently, all the remaining agents receive the information transmitted from the agent ai as information directed to them. An operation of the agent aj in FIG. 5, as one of the remaining agents, will be described below. A self-information management section 52-11 of the agent aj stores information associated with the agent aj. The information DT2-1 indicates that agents capable of executing a task D (D(?)→ a(j)) and a task H (H(?)→b(j)) are required. A selection criterion in a problem solving information selecting section 52-15 indicates such a requirement. A receiving section 52-14 receives the information DT1-2 equivalent to the information DT1-1 associated with the agent ai. The problem solving information selecting section 52-15 selects information DT3, required for the agent aj to perform a problem solving operation, from the information DT1-2 received through the receiving section 52-14 on the basis of the selection criterion. More specifically, from the information DT1-2, information "D(i)→a(j)" and "H(i)→b(j)" are selected on the basis of information D(i) for the task D and information H(i) for the task H. In addition, information "e(j)→D(i)" and "H(i)→b(j)" are selected as information associated with the self-agent. These pieces of selected information DT3 are added to information DT2-2 stored already in a problem solving information management section 52-16, and is managed as information DT4. A problem solving section 52-20 of the agent aj can know from the information DT4 that the agent ai can execute the tasks D and H.

A transmission information selecting section 52-12 of the agent aj selects information DT5-1, required for the new agent ai to perform a problem solving, from the information DT2-1 associated with the agent aj and stored in the self-information management section 52-11 on the basis of the sort criterion of the agent ai which is included in the information DT1-2 received through the receiving section 52-14. That is, the section 52-12 selects information "b(j)→ A(i); H(i)→b(j); e(j), H(i)→D(i)". The address of the agent aj and the address of the agent ai as a destination are added to the selected information DT5-1, and the resultant information is transmitted to the agent ai through a transmitting section 52-13 and the communication network 53.

The information DT5-1 transmitted from the agent aj is received by the receiving section 51-14 of the agent ai and is output, as information DT5-2, to the problem solving information selecting section 51-15. If a plurality of agents including the agent aj respond to an inquiry from the agent ai, the receiving section 51-14 receives and stores all the information. Selection of required information is performed in an order of reception. The problem solving information selecting section 51-15 selects information DT6, required for the agent ai to perform a problem solving operation, from the received information DT5-2 on the basis of the selection criterion already held by the section 51-15. That is, the section 51-15 selects information "b(j)→A(i); e(j), H(i)→ D(i); H(i)→b(j)". The selected information DT6 is input to the problem solving information management section 51-16. The problem solving information management section 51-16 adds the information DT6 to the already managed information DT1-3, and manages the resultant information as information DT7. In this manner, all the pieces of information of the remaining agents which are associated with the problem solving of the agent ai are set in the management section 51-16. The problem solving section 51-20 can fetch required information from the information DT7 to use it.

Figure 6:
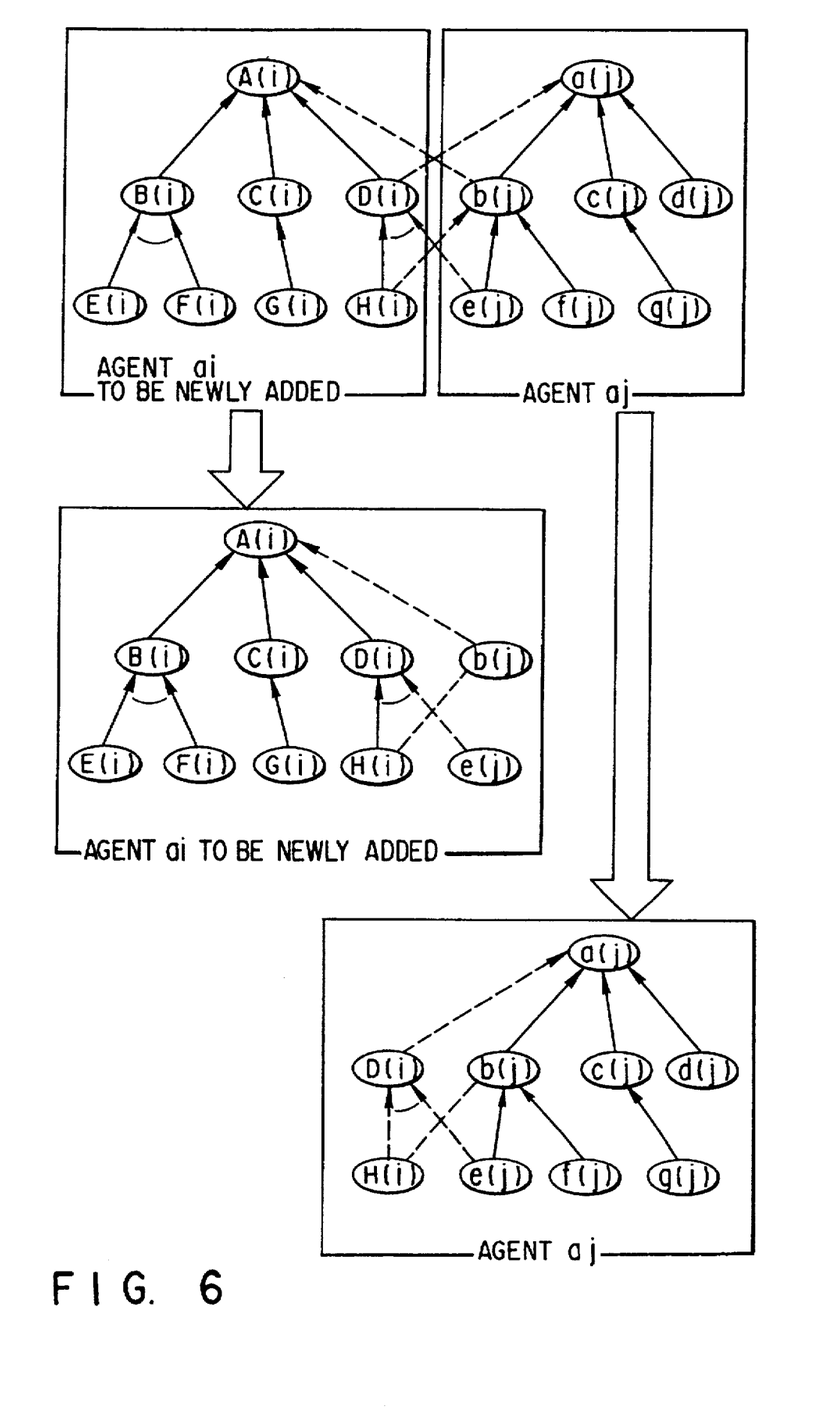
FIG. 6 is a view showing pieces of information held in problem solving information management sections of the agent ai and the agent aj and the relationship between the information before and after the agent ai is newly added.

FIG. 6 is a view showing the relationship between pieces of information in the problem solving information management sections 16 of the agents ai and aj before and after the agent ai exchange information to select cooperative agents, e.g., before and after the agent ai is newly added to the solver 1. Referring to FIG. 6, the problem solving information management section 16 of the agent ai determines that the agent aj can execute the tasks b(j) and e(j) for which no capable agents are specified, and stores and manages these tasks, at the same time when the agent ai is added to the solver 1. The problem solving information management section 16 of the agent aj determines that the agent ai can execute the tasks D(i) and H(i), and stores and manages these tasks, when the agent ai is added to the solver 1. With this operation, the problem solving section 20 of each agent can know whether the self-agent has tasks required for a problem solving operation and know which agents can execute the tasks that the self-agent cannot execute, by referring to the problem solving information management section 16.

Assume that the problem solving information for selecting cooperative agents is not managed sufficiently by the problem solving information management section 16, and the problem solving section 20 determines that information having a more detailed relationship is required, after an agent is added. In this case, selection criterions held by the transmission information selecting section 12 and the problem solving information selecting section 15 are temporarily updated, and the updated selection criterions are added to transmission information in the transmission information selecting section 12. The resultant information is then transmitted to the remaining agents to inquire about the required information, thus acquiring the required information. In addition, this information acquisition may be performed by causing the problem solving section 20 to directly inquire of the remaining agents through the communication network 21 without the mediacy of the information acquisition/ management section 10. When an agent is to be released from the cooperative distributed problem solver 1, information indicating the release is transmitted to the remaining agents together with the address of the agent to be released and a common address as a destination address. The problem solving section 20 of each agent determines a call from the released agent as an invalid call.

As has been described above, for example, in a new agent joining operation, each agent exchanges information associated with itself with the remaining agents so that each agent can use pieces of information associated with the remaining agents and required for the selection of cooperative agents capable of solving the problem held by each agent. Therefore, the communication amount between agents, which are required to select cooperative agents for a cooperative problem solving, can be reduced. In addition, concentration of a load on a specific agent can be prevented, and hence the influence of a defective agent on the remaining agents can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A distributed problem solving apparatus, comprising:

a communications network for passing messages between computers connected thereto; and first and second computers, coupled to said communications network, said first computer comprising a first agent, said second computer comprising a second agent, wherein said first agent comprises:

first problem-solving means for solving a problem requiring execution of a first plurality of tasks;

first problem solving management means, coupled to said first problem-solving means, for managing information which defines dependencies among said first plurality of tasks;

first transmission means for transmitting to said second agent information regarding tasks which may be executed by said first agent; and first receiving means for receiving from said second agent information regarding tasks which may be executed by said second agent; and wherein said second agent comprises:

second problem-solving means for solving a problem requiring execution of a second plurality of tasks;

second problem solving management means, coupled to said second problem-solving means, for managing information which defines dependencies among said second plurality of tasks;

second transmission means for transmitting to said first agent information regarding tasks which may be executed by said second agent; and second receiving means for receiving from said first agent information regarding tasks which may be executed by said first agent.

2. The apparatus of claim 1, wherein said first agent further comprises means for selecting from said received information certain tasks on the basis of said dependencies and providing said certain tasks to said first problem solving means.

3. The apparatus of claim 1, wherein said first agent comprises means for selecting information for transmission to said second agent based on selection criteria received from said second agent by said first receiving means; and wherein said second agent comprises means for selecting information for transmission to said first agent based on selection criteria received from said first agent by said second receiving means.

4. The apparatus of claim 3, wherein each agent comprises means for releasing itself from tasks required by the other agent.

5. The apparatus of claim 1, wherein said first agent comprises means for selecting and transmitting to said second agent a criterion indicating which of said first plurality of tasks cannot be executed by said first agent, and an address of said first agent.

6. The apparatus of claim 5, further comprising a third agent coupled to said communication network, wherein said means for selecting and transmitting transmits said criterion to both said second and third agents.

* * * * *